United States Patent
Hara et al.

(10) Patent No.: US 10,138,818 B2
(45) Date of Patent: Nov. 27, 2018

(54) INTERNAL COMBUSTION ENGINE CONTROL SYSTEM

(71) Applicant: HONDA MOTOR CO., LTD., Tokyo (JP)

(72) Inventors: Takeshi Hara, Saitama (JP); Terukazu Torikai, Saitama (JP); Eri Itou, Saitama (JP); Yuusuke Obata, Saitama (JP); Hideki Takahashi, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 319 days.

(21) Appl. No.: 14/425,468

(22) PCT Filed: Sep. 3, 2013

(86) PCT No.: PCT/JP2013/073687
§ 371 (c)(1),
(2) Date: Mar. 3, 2015

(87) PCT Pub. No.: WO2014/038552
PCT Pub. Date: Mar. 13, 2014

(65) Prior Publication Data
US 2015/0233304 A1    Aug. 20, 2015

(30) Foreign Application Priority Data
Sep. 4, 2012 (JP) .................. 2012-194147

(51) Int. Cl.
| | | |
|---|---|---|
| F02D 11/10 | (2006.01) | |
| F02D 9/02 | (2006.01) | |
| F02D 41/00 | (2006.01) | |
| B60W 10/06 | (2006.01) | |
| B60W 10/08 | (2006.01) | |

(52) U.S. Cl.
CPC .............. *F02D 9/02* (2013.01); *B60W 10/06* (2013.01); *B60W 10/08* (2013.01);
(Continued)

(58) Field of Classification Search
CPC ......... B60W 2510/0638; B60W 10/06; B60W 10/08; F02D 11/105; F02D 2200/501; F02D 9/02; F02D 41/0002; Y10T 477/62427
(Continued)

(56) References Cited

U.S. PATENT DOCUMENTS 4,507,986 A * 4/1985 Okamura .............. B60W 10/06
                                                      477/43
5,532,929 A * 7/1996 Hattori ................. B60K 31/047
                                                      123/361
(Continued)

FOREIGN PATENT DOCUMENTS

| CN | 101044307 A | 9/2007 |
|---|---|---|
| JP | 59-074341 A | 4/1984 |

(Continued)

OTHER PUBLICATIONS

International Search Report and Written Opinion dated Oct. 1, 2013 corresponding to International Patent Application No. PCT/JP2013/073687 and English translation thereof.
(Continued)

*Primary Examiner* — Hai Huynh
*Assistant Examiner* — Gonzalo Laguarda
(74) *Attorney, Agent, or Firm* — Squire Patton Boggs (US) LLP

(57) ABSTRACT

Provided is an internal combustion engine control system capable of simultaneously and suitably carrying out the will of a driver to accelerate and modifications to the throttle opening degree characteristics. An internal combustion engine control system is provided with an accelerator pedal operation amount sensor for detecting the accelerator pedal operation amount, a storage unit for storing multiple different throttle opening degree characteristics of an engine
(Continued)

relative to the accelerator pedal operation amount, a switch for selecting the throttle opening degree characteristic pertaining to a plus sports mode in response to an operation, and an engine control unit for controlling the throttle opening degree of the engine on the basis of the selected throttle opening degree characteristic and the detected accelerator pedal operation amount.

11 Claims, 9 Drawing Sheets

(52) U.S. Cl.
CPC .. *F02D 41/0002* (2013.01); *F02D 2009/0289* (2013.01); *Y10S 903/903* (2013.01)

(58) Field of Classification Search
USPC .......................... 701/104, 110, 103; 123/399
See application file for complete search history.

(56) References Cited

U.S. PATENT DOCUMENTS

| | | | | |
|---|---|---|---|---|
| 5,636,909 | A * | 6/1997 | Hirao | B60K 28/16 303/113.2 |
| 6,442,472 | B1 * | 8/2002 | Vivek | F02D 11/105 123/350 |
| 2006/0169036 | A1 * | 8/2006 | Eguchi | F16D 48/066 73/168 |
| 2006/0276952 | A1 * | 12/2006 | Niessen | F02D 29/02 701/101 |
| 2009/0070013 | A1 | 3/2009 | Shimojo et al. | |
| 2009/0299560 | A1 | 12/2009 | Tomatsuri et al. | |
| 2011/0046864 | A1 * | 2/2011 | Kamiya | F02N 11/0833 701/102 |
| 2013/0085655 | A1 * | 4/2013 | Kii | B60K 31/18 701/103 |

FOREIGN PATENT DOCUMENTS

| | | | | |
|---|---|---|---|---|
| JP | 64-015450 | A | 1/1989 | |
| JP | 1297982 | A2 * | 4/2003 | ............... B60K 6/48 |
| JP | 2004-108342 | A | 4/2004 | |
| JP | 2005-273833 | A | 10/2005 | |
| JP | 2009-286282 | A | 12/2009 | |

OTHER PUBLICATIONS

Chinese Office Action application No. 201380042242.0 dated Jun. 3, 2016.

* cited by examiner

INTERNAL COMBUSTION ENGINE CONTROL SYSTEM

TECHNICAL FIELD

The present invention relates to an internal combustion engine control system for controlling an internal combustion engine of a vehicle.

BACKGROUND ART

As a technology for achieving acceleration according to a driver's intention of accelerating, Patent Literature 1 shows description of achieving a satisfied acceleration in the following manner. That is, a driver performs switching operation to change the throttle opening degree characteristic, which is the relationship between the operation amount of an accelerator pedal and the throttle opening degree of an internal combustion engine, so that the throttle opening degree of the internal combustion engine becomes large even with a small operation amount of an accelerator pedal.

BACKGROUND ART DOCUMENT

Patent Literature

Patent Literature 1: JP 59-074341 A

DISCLOSURE OF THE INVENTION

Problem to be Solved by the Invention

However, in the technology described in Patent Literature 1, as the throttle opening degree characteristic is changed by switching operation, the throttle opening degree changes and acceleration starts before a driver actually presses down on the accelerator pedal. Consequently, the driver's intention of accelerating and the change in the throttle opening degree characteristic hardly associate with each other.

The present invention has been developed in this situation, and an object of the present invention is to provide an internal combustion engine control system capable of making a driver's intention of accelerating and a change in the throttle opening degree characteristic appropriately associate with each other.

Means for Solving the Problem

In order to solve the above-described problem, an internal combustion engine control system according to the present invention includes: an accelerator pedal operation amount detecting section for detecting an accelerator pedal operation amount of a vehicle; a storage section in which plural different throttle opening degree characteristics of the internal combustion engine with respect to the accelerator pedal operation amount are stored; an operating section for selecting a throttle opening degree characteristic, corresponding to an operation; and a control section for controlling the throttle opening degree of the internal combustion engine, based on the selected throttle opening degree characteristic and the detected accelerator pedal operation amount, wherein, after the selection of the throttle opening degree characteristic by operation of the operating section, the control section changes throttle opening degree characteristic to the selected throttle opening degree characteristic on condition of an increase in the accelerator pedal operation amount.

By this arrangement, it is possible; not to change throttle opening degree characteristic after operation of the operation section, until the driver presses down on the accelerator pedal; not to change throttle opening degree characteristic if the driver does not press down on the accelerator pedal; and to thereby appropriately associate the driver's intention of accelerating and a change of the throttle opening degree characteristic with each other, while preventing acceleration caused by erroneous operation of the operation section by the driver.

Arrangement may be made in such a manner that the throttle opening degree characteristic selected by the operating section is set such that an increase in the throttle opening degree accompanying an increase in the accelerator pedal operation amount is greater than that of the throttle opening degree characteristic before the change.

Arrangement may be made in such a manner that, after the change to the selected throttle opening degree characteristic, if the operating section is again operated, then the control section changes the throttle opening degree characteristic to that before the change. Further, arrangement may be made such that, after the change to the selected throttle opening degree characteristic, if an operation is performed such that the accelerator pedal operation amount decreases, then the control section changes the throttle opening degree characteristic to that before the change. Still further, arrangement may made such that the internal combustion engine control system includes a brake pedal operation detecting section for detecting a brake pedal operation of the vehicle, wherein, after the change to the selected throttle opening degree characteristic, if the brake pedal operation is detected, then the control section changes the throttle opening degree characteristic to that before the change.

By these arrangements, it is possible, at an appropriate timing, to change throttle opening degree characteristic to that before the change, and appropriately associate the driver's intention of accelerating and the change of throttle opening degree characteristic with each other.

Arrangement may be made such that the internal combustion engine control system includes a vehicle speed detecting section for detecting a vehicle speed of the vehicle, wherein, in a state that the vehicle speed is lower than a predetermined vehicle speed, the control section prohibits changing the throttle opening degree characteristic even if the accelerator pedal operation amount increases after selection of the throttle opening degree characteristic by operation of the operating section. Further, arrangement may made such that: the vehicle includes: a motor that functions as a movement power source of the vehicle as well as the internal combustion engine, and a battery for supplying electrical power to the motor; the internal combustion engine control system includes a battery electric storage amount detecting section for detecting an electric storage amount of the battery; and in a state that the electric storage amount of the battery is smaller than a predetermined electric storage amount, the control section prohibits changing the throttle opening degree characteristic even if the accelerator pedal operation amount increases after selection of the throttle opening degree characteristic by operation of the operating section. Still further, arrangement may be made such that the internal combustion engine control system includes a steering angle detecting section for detecting a steering angle of the vehicle, wherein, if the steering angle exceeds a predetermined steering angle, the control section prohibits changing the throttle opening degree characteristic even if the accelerator pedal operation amount increases after selection of the throttle opening degree characteristic by operation of the operating section.

By these arrangements, it is possible to prevent changing throttle opening degree characteristic in a state inappropriate for changing.

Arrangement may be made such that the internal combustion engine control system includes a notifying section for notifying a waiting state in which the throttle opening degree characteristic has been selected and an operating state in which throttle opening degree characteristic has been changed to the selected throttle opening degree characteristic, based on output from the control section.

By this arrangement, it is possible to appropriately notify the state of the vehicle to the driver.

Arrangement may be made such that the internal combustion engine control system includes a notifying section for notifying a waiting state in which the throttle opening degree characteristic has been selected and an operating state in which throttle opening degree characteristic has been changed to the selected throttle opening degree characteristic, wherein, when the control section prohibits changing the throttle opening degree characteristic, the control section outputs notification of the prohibition to the notifying section.

By this arrangement, it is possible to prevent the driver from having a strange feeling caused by impossibility of changing throttle opening degree characteristic.

Advantage of the Invention

According to the present invention, it is possible to appropriately associate a driver's intention of accelerating and changing throttle opening degree with each other.

EMBODIMENT FOR CARRYING OUT THE INVENTION

In the following, an internal combustion engine control system according to the present invention in an embodiment of the present invention will be described with reference to the drawings, taking an example of a case where the internal combustion engine control system is applied to a hybrid vehicle provided with an internal combustion engine and a motor as movement power sources. The same symbols are assigned to the respective same parts, and overlapping description will be omitted.

Figure 1:
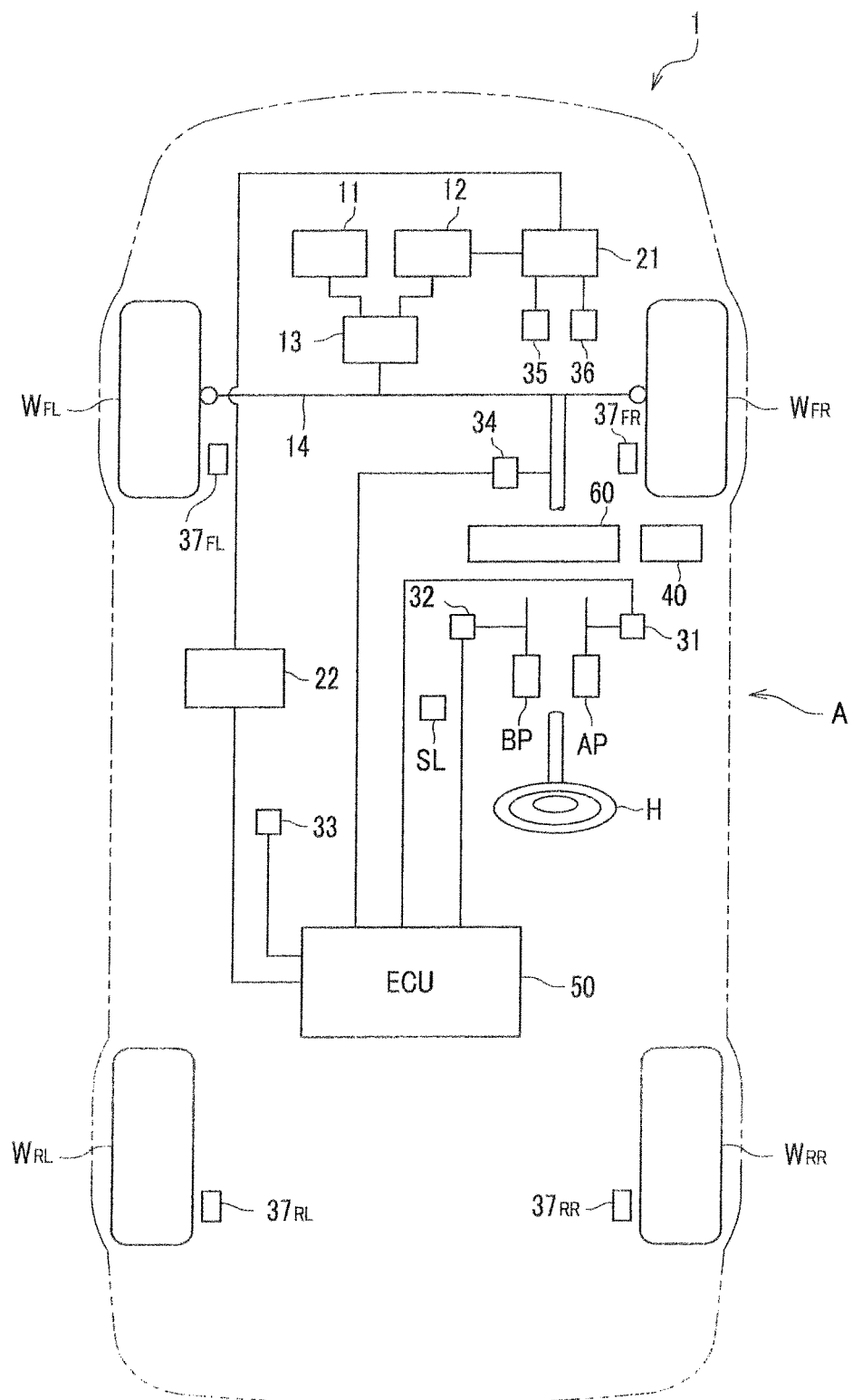
FIG. 1 is a schematic diagram showing a vehicle to which an internal combustion engine control system according an embodiment of the present invention is applied.

As shown in FIG. 1, a vehicle 1 according to the embodiment of the present invention is a front engine front drive (FF) vehicle, which drives the left and right front wheels $W_{FL}$, $W_{FR}$ being driving wheels, and is provided with an engine 11, which is an internal combustion engine and is one of movement power sources, a motor 12, which is one of the movement power sources, a transmission 13, and a front wheel driving shaft 14. Driving force generated by at least one of the engine 11 and the motor 12 is transmitted to the left and front wheels $W_{FL}$, $W_{FR}$ through the transmission 13 and the front driving shaft 14. In such a vehicle 1, the left and right rear wheels $W_{RL}$, $W_{RR}$ are driven wheels, which rotate accompanying the drive of the vehicle 1. The 13 is a continuously variable transmission (CVT) that is driven, based on the operation of a shift lever SL by the driver. Further, on the driver's seat side in the compartment of the vehicle 1, provided are an accelerator pedal AP, a brake pedal BP for operation of a service braking system, and a shift lever SL.

The vehicle 1 according to an embodiment of the present invention is further provided with a battery 21 and a DC/DC convertor 22. The DC/DC convertor 22 operates during the operation of the engine 11 and stops when the engine 11 stops. Electrical power stored in the battery 21 is supplied to the motor 12, and is besides supplied to various electrical units (such as a meter display section, an audio system, and a navigation system) of the vehicle 1 through the DC/DC convertor 22. The motor 12 also functions as an engine that collects, as a regenerated energy, the kinetic energy generated at the time of operation of the braking devices (not shown) provided at the wheels $W_{FL}$, $W_{FR}$, $W_{RL}$, and $W_{RR}$. Regenerated energy collected by the engine is stored as electrical power in the battery 21.

Various Sensors

As configuration of an internal combustion engine control system A, the vehicle 1 according to the embodiment of the present invention is provided with an accelerator pedal operation amount sensor 31, a brake pedal switch 32, a vehicle speed sensor 33, a steering angle sensor 34, a battery sensor (voltage sensor) 35, a battery sensor (current sensor) 36, and wheel speed sensors 37 ($37_{FL}$, $37_{FR}$, $37_{RL}$, $37_{RR}$).

The accelerator pedal operation amount sensor 31 is an example of an accelerator pedal operation amount detecting section that detects the operation amount of an accelerator pedal, detects the operation amount of an accelerator pedal AP by the driver, and outputs the detected operation amount to a later-described ECU 50.

The brake pedal switch 32 is an example of a brake pedal operation detecting section that detects operation of a brake pedal, detects operation of a brake pedal BP by the driver, and outputs the detected operation to the ECU 50. In detail, the brake pedal switch 32 is OFF in a state that the brake pedal BP is not operated, and outputs ON signal to the ECU 50 when the brake pedal BP is operated.

The vehicle speed sensor 33 is an example of a vehicle speed detecting section that detects the vehicle speed, which is the vehicle body speed of the vehicle 1, and outputs the detected vehicle speed to the ECU 50.

The steering angle sensor 34 is an example of a steering angle detecting section that detects the steering angle of the vehicle 1, detects the steering angle made by a driver's operation of a steering wheel H, and outputs the detected steering angle to the ECU 50.

The voltage sensor 35 detects the battery voltage value, which is the voltage value of the battery 21, and outputs the detected voltage value to the ECU 50. The current sensor 36 detects the battery discharge current value, which is the current value discharged from the motor 12, and outputs the detected current value to the ECU 50.

The wheel speed sensors $37_{FL}$, $37_{FR}$, $37_{RL}$, $37_{RR}$ detect the respective wheel speeds of the wheels $W_{FL}$, $W_{FR}$, $W_{RL}$, $W_{RR}$, and output the detected wheel speeds to the ECU 50.

Operating Section

Figure 2:
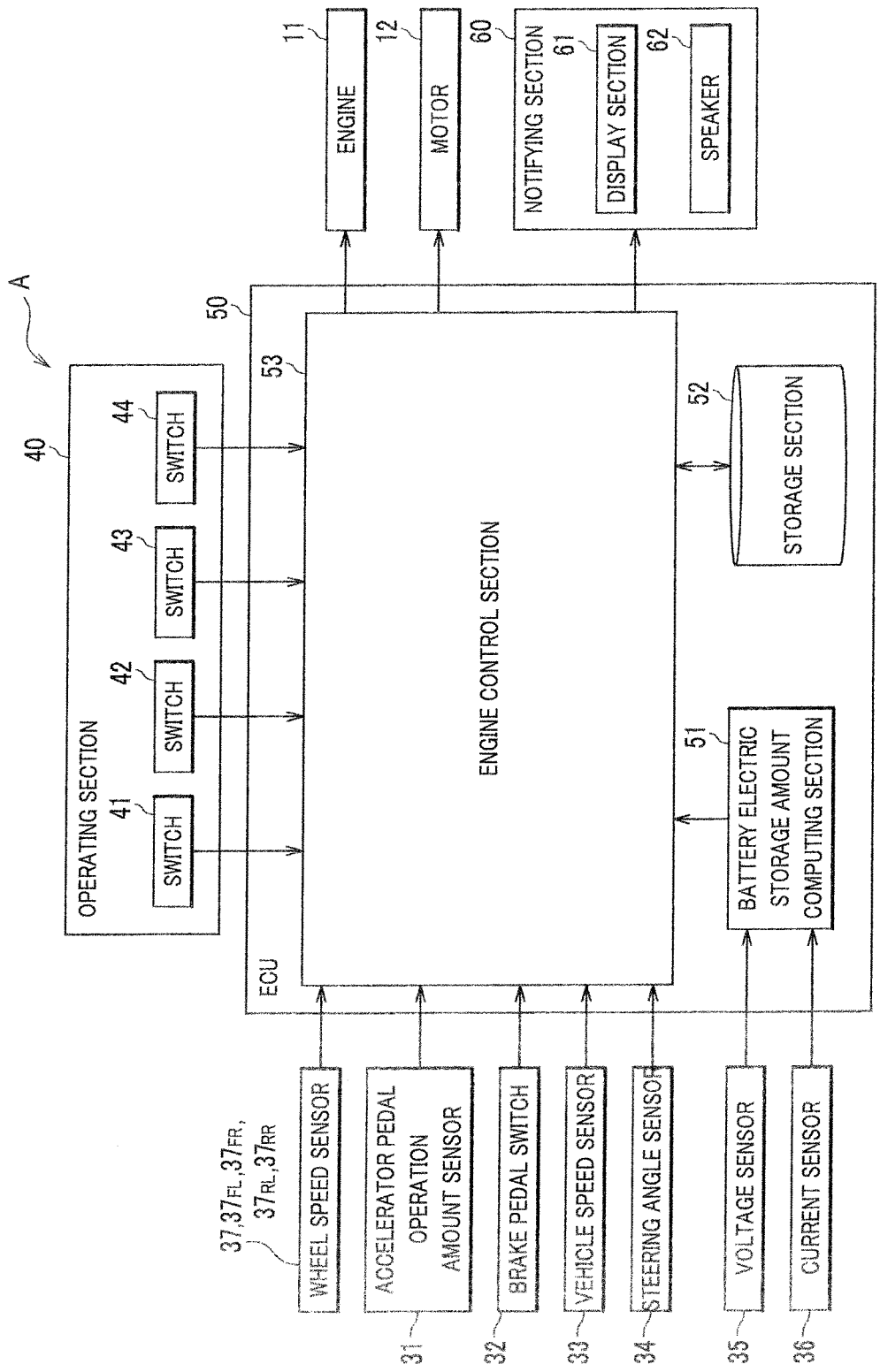
FIG. 2 is a block diagram showing the internal combustion engine control system in the embodiment of the invention.

As the configuration of the internal combustion engine control system A, the vehicle 1 according to the embodiment of the present invention is provided with an operating section 40 arranged in the vehicle compartment. As shown in FIG. 2, the operating section 40 is provided with switches 41, 42, 43, 44, which are pressed down when the driver selects respective modes related to the throttle opening degree characteristics.

Figure 3:
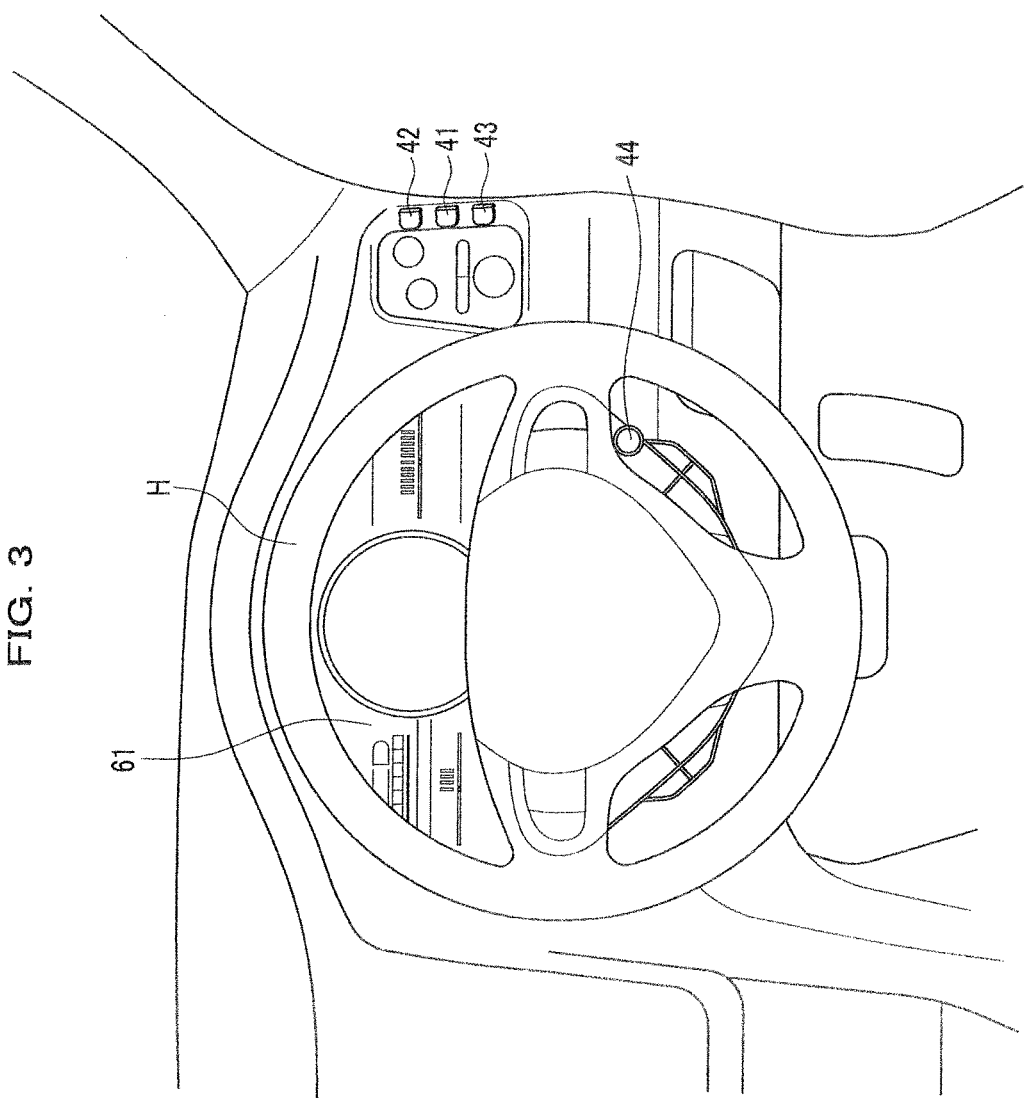
FIG. 3 is a diagram showing the operating section and the notifying section of the vehicle in the embodiment of the invention.

As shown in FIG. 3, the switch 41 is a switch that is arranged on the instrument panel in the vehicle compartment, the switch 41 being on the right side of the steering wheel H, and is used to select a normal mode described later. The switch 42 is a switch that is arranged on the instrument panel in the vehicle compartment, the switch 42 being on the right side of the steering wheel H and on the upper side of the switch 41, and is used to select a sport mode described later. The switch 43 is a switch that is arranged on the instrument panel in the vehicle compartment, the switch 43 being on the right side of the steering wheel H and on the lower side of the switch 41, and is used to select an eco-mode described later. The switch 44 is a switch arranged integrally with the steering wheel H in the vehicle compartment and is used to select a plus sport mode described later.

In such a manner, the switches 41-43 are arranged on the instrument panel in the vehicle compartment, and the switch 44 is arranged at the steering wheel H. Thus, it is possible to appropriately prevent erroneous operation of the switch 44 when the driver intends to operate one of the other switches 41-43.

ECU and Notifying Section

The vehicle 1 according to the embodiment of the present invention is provided with an ECU (Electronic Control Unit) 50 and a notifying section 60 as configuration of the internal combustion engine control system A. The ECU 50 is configured by, for example, a CPU (Central Processing Unit), a RAM (Random Access Memory), a ROM (Read-Only Memory), an input-output circuit, and the like. The vehicle 1 controls the engine 11 and the motor 12, which are the movement power sources of the vehicle 1, the notifying section 60, and the like, based on detection results of various sensors, and the like.

As shown in FIG. 2, the ECU 50 according to the embodiment of the present invention is provided with a battery electric storage amount computing section 51, an electric storage section 52, and an engine control section 53, as a function block.

The battery electric storage amount computing section 51 computes a battery electric storage amount, based on detection results by the voltage sensor 35 and the current sensor 36. Concretely, the battery electric storage amount computing section 51 obtains the capacity of the battery 21 by SOC (State Of Charge) represented by the ratio of the remaining capacity to the fully charged capacity. A computation result by the battery electric storage amount computing section 51 is output to the engine control section 53.

Figure 4:
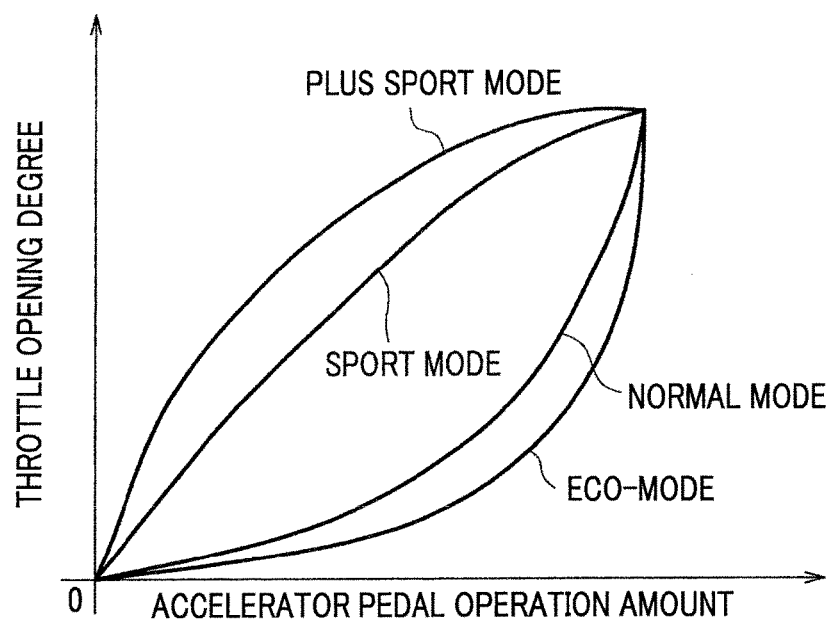
FIG. 4 is a diagram of graphs showing the relationship between the operation amount of an accelerator pedal and the throttle opening degree in the plural throttle opening degree characteristics.

Plural different throttle opening degree characteristics of the engine 11 related to the accelerator pedal operation amount are stored in the storage section 52. As shown in FIG. 4, the throttle opening degree characteristics stored in the storage section 52 in the present embodiment are four throttle opening degree characteristics that are a normal mode, a sport mode, an eco-mode, and a plus sport mode.

The normal mode has a throttle opening degree characteristic that is selected when the switch 41 is operated (when none of other modes is selected). The throttle opening degree characteristic in the normal mode is represented by a downward convex curve on which the throttle opening degree increases as the accelerator pedal operation amount increases.

The sport mode has a throttle opening degree characteristic selected when the switch 42 is operated, and the increase amount of the throttle opening degree accompanying an increase in the accelerator pedal operation amount is larger, compared with that in the normal mode. The throttle opening degree characteristic in the sport mode is represented by an upward convex curve on which the throttle opening degree increases as the accelerator pedal operation amount increases. When the accelerator pedal operation amount is at the maximum, the throttle opening degree in the sport mode is equal to the throttle opening degree in the normal mode. That is, a driver who intends to accelerate the vehicle 1 operates the switch 42 for switching to the sport mode, and it is thereby possible to appropriately accelerate the vehicle 1 by a smaller accelerator pedal operation amount.

The eco-mode has a throttle opening degree characteristic selected when the switch 43 is operated, and the increase amount of the throttle opening degree accompanying an increase in the accelerator pedal operation amount is smaller, compared with that in the normal mode. The throttle opening degree characteristic in the eco-mode is represented by a downward convex curve on which the throttle opening degree increases accompanying an increase in the accelerator pedal operation amount. When the accelerator pedal operation amount is at the maximum, the throttle opening degree in the eco-mode is equal to the throttle opening degree in the normal mode. That is, a driver who intends to reduce the fuel economy operates the switch 43 for switching to the eco-mode, and it is thereby possible to reduce the fuel economy, appropriately reducing the acceleration of the vehicle 1.

The plus sport mode has a throttle opening degree characteristic selected when the switch 44 is operated and other conditions are satisfied, and the increase amount of the throttle opening degree accompanying an increase in the accelerator pedal operation amount is further larger, compared with that in the sport mode. The throttle opening degree characteristic in the plus sport mode is represented by an upward convex curve on which the throttle opening degree increases accompanying an increase in the accelerator pedal operation amount. When the accelerator pedal operation amount is at the maximum, the throttle opening degree in the plus sport mode is equal to the throttle opening degree in the normal mode. That is, a driver, who intends to accelerate the vehicle 1 more, operates the switch 44 for switching to the plus sport mode and satisfies the other conditions, and it is thereby possible to further appropriately accelerate the vehicle 1 by a smaller accelerator pedal operation amount.

The engine control section 53 reads out a throttle opening degree characteristic corresponding to the content of operation from the storage section 52, based on operation of the operating section 40 by a driver, and sets it as the throttle opening degree characteristic at out The engine control section 53 normally reads out a throttle opening degree characteristic, of the normal mode, stored in the storage section 52, and controls the engine 11, based on the throttle opening degree characteristic having been read out. Further, when the switch 42 is pressed down, the engine control section 11 reads out the throttle opening degree characteristic, of the sport mode, stored in the storage section 52, and controls the engine 11, based on the throttle opening degree characteristic having been read out. Still further, when the switch 43 is pressed down, the engine control section 11 reads out the throttle opening degree characteristic, of the eco-mode, stored in the storage section 52, and controls the engine 11, based on the throttle opening degree characteristic having been read out. In a state that the sport mode or the eco-mode is selected, when the switch 41 is pressed down, the engine control section 11 reads out the throttle opening degree characteristic, of the normal mode, stored in the storage section 52, and controls the engine 11, based on the throttle opening degree characteristic having been read out. The plus sport mode will be described later in detail.

The notifying section 60 is provided with a display section 61, which is a monitor or the like that performs notification by image output, and a speaker 62 that performs notification by audio output. The display section 61 displays the state of the engine control section 53 in the plus sport mode, and the like.

Plus Sport Mode

Figure 5:
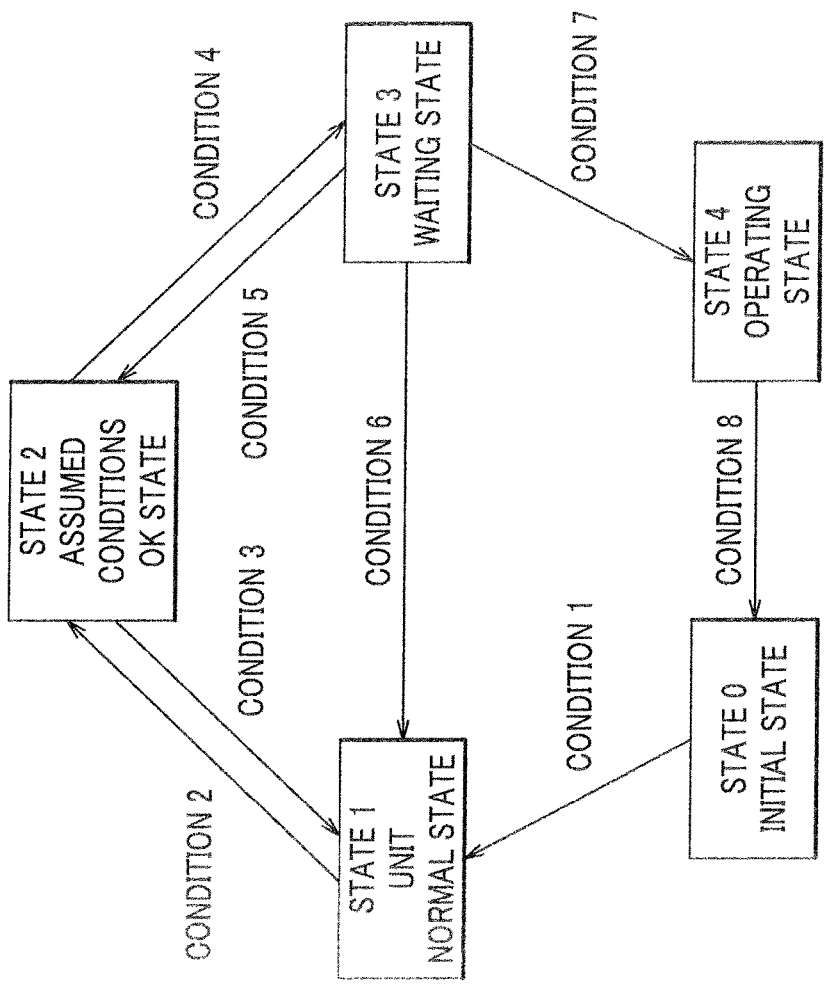
FIG. 5 is a schematic diagram showing the transition of the state related to the plus sport mode of an engine control section according to the embodiment of the invention.

Subsequently, the operation of the internal combustion engine control system A in the plus sport mode will be described, referring to FIG. 5 and FIG. 6. As shown in FIG. 5, the states of the engine control section 53 related to the plus sport mode are categorized into STATE 0 to STATE 4.

STATE 0

STATE 0 is the initial state at the time of ignition ON of the vehicle 1 and at the time of termination of the plus sport mode in STATE 4, wherein the engine control section 53 makes, displayed on the display section 61, a battery electric storage amount gage 61a representing the electric storage mount of the battery 21 and a motor state gage 61b representing the motor state (whether the motor is assisting the engine 11 or electrical charging is performed). The respective gages 61a, 61b are always displayed during the states STATE 0 to STATE 4. The engine control section 53 transitions from STATE 0 to STATE 1 when all of the following Conditions 1 are satisfied.

Conditions 1

Self-diagnosis is performed on respective units of the internal combustion engine control system A, and all the units are diagnosed as normal.

A predetermined time (for example several seconds) has elapsed (only at the time of termination of plus sport mode, in other words, when the state has transitioned from STATE 4 to STATE 0).

STATE 1

STATE 1 is a unit normal state in which the respective units of the internal combustion engine control system A are normal. The engine control section 53 transitions from STATE 1 to STATE 2 if all of the respective conditions of the following Conditions 2 are satisfied.

Conditions 2

The electric storage amount of the battery 21 is larger than or equal to a predetermined electric storage amount (for example, an electric storage amount that is sufficient to supply electrical power to other units of the vehicle 1, while supplying electrical power to the motor 12 in order to make the motor 12 generate an assist torque).

The steering angle is lower than or equal to a first predetermined steering angle (for example, a steering angle that can be generated by a lane change).

The gear ratio of the transmission 13 is lower than or equal to a predetermined gear ratio (for example, a value on the boundary between the low speed region and the medium speed region). If the transmission 13 is a transmission with gears, the gear stage is, for example, one of second to sixth stages.

The vehicle speed is higher than or equal to a predetermined vehicle speed (for example, the value on the boundary between the low speed region and the medium speed region).

STATE 2

Figure 6A:
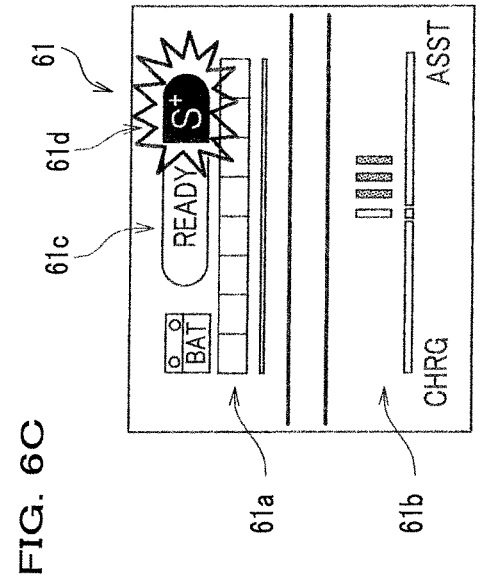
FIGS. 6A-6D are diagrams showing examples of display screens on a display section.
Figure 6B:
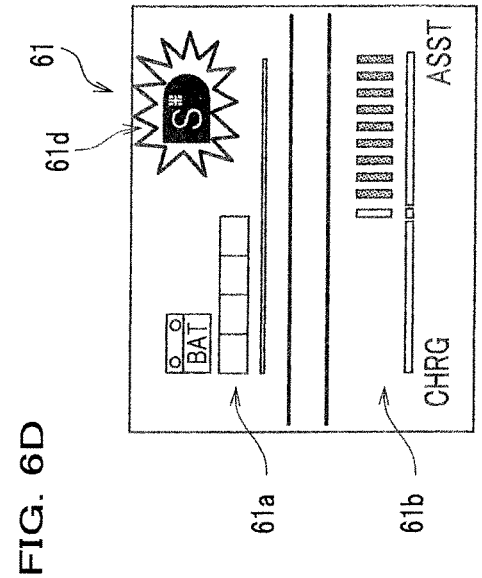

STATE 2 is an assumed conditions OK state in which assumed conditions for executing the plus sport mode are satisfied, wherein the engine control section 53 makes a READY mark 61c and a plus sport mark 61d lighted and displayed on the display section 61 (see FIG. 6B). If any one of the respective conditions of the following Conditions 3 are satisfied (in other words, Conditions 2 have become unsatisfied), the engine control section 53 transitions from STATE 2 to STATE 1.

Conditions 3

The electric storage amount of the battery 21 is smaller than the above-described predetermined electric storage amount (for example, an electric storage amount that is sufficient to supply electrical power to other units of the vehicle 1, while supplying electrical power to the motor 12 in order to make the motor 12 generate an assist torque).

The steering angle is exceeding the above-described first predetermined steering angle (for example, a steering angle that can be generated by a lane change).

The gear ratio of the transmission 13 is exceeding the above-described predetermined gear ratio (for example, a value on the boundary between the low speed region and the medium speed region). If the transmission 13 is a transmission, the gear stage is, for example, other than second to sixth stages.

The vehicle speed is lower than the above-described predetermined vehicle speed (for example, the value on the boundary between the low speed region and the medium speed region).

In such a manner, by arranging such that STATE 2 returns to STATE 1 when the vehicle speed is lower than the above-described predetermined vehicle speed, it is possible to appropriately prevent that the plus sport mode is executed immediately after a start of the vehicle 1, at an intersection, or in a crowd.

Further, by arrangement such that STATE 2 returns to STATE 1 when the steering angle is exceeding the first predetermined steering angle, it is possible to appropriately prevent that the plus sport mode is executed during a tight winding drive.

Further, the engine control section 53 transitions from STATE 2 to STATE 3 if the following CONDIRION 4 is satisfied.

Condition 4

The switch 44 is pressed down and the flag of the switch 44 is 1.

Herein, the engine control section 53 has the flag of the switch 44, and normally sets the flag to 0. When the switch 44 is pressed down and ON signal is output, the engine control section 53 resets the flag to 1, and when the switch 44 is again pressed down and ON signal is output, the engine control section 53 resets the flag to 0. Further, the engine control section 53 may be arranged such as to reset the flag to 0 when one of other switches 41-43 is pressed down in a state that the flag is set to 1.

STATE 3

Figure 6C:
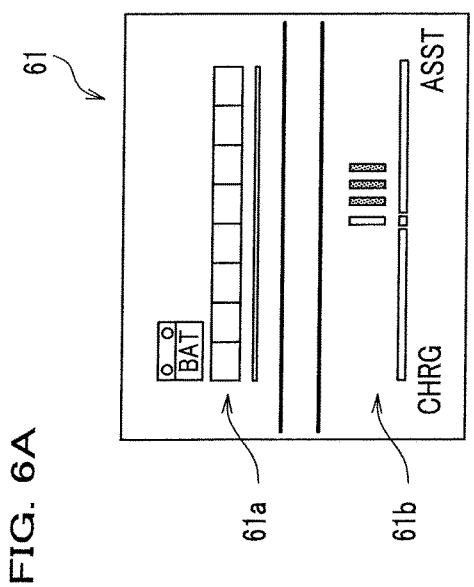

STATE 3 is a waiting state waiting for transition to the plus sport mode, wherein the engine control section 53 makes the READY mark lighted and displayed on the display section 61, and makes the plus sport mark blinking and displayed on the display section 61 (see FIG. 6C). The engine control section 53 transitions from STATE 3 to STATE 2 if any one of the following Conditions 5 is satisfied.

Conditions 5
  A waiting time (for example, a predetermined time shorter than or equal to 10 seconds) has elapsed.
  A clutch (not shown) provided between the transmission 13 and the front wheel driving shaft is in a non-fastened state.
  The brake pedal switch is ON.
  The driving wheels $W_{FL}$, $W_{FR}$ are in a skid state. In detail, the average value of the wheel speeds of the driving wheels $W_{FL}$, $W_{FR}$ is higher than the average value of the driven wheels $W_{RL}$, $W_{RR}$ by a value greater than or equal to a predetermined value (That is, the wheel speeds of the driving wheels $W_{FL}$, $W_{FR}$ are excessively high.)
  One of the driven wheels $W_{RL}$, $W_{RR}$ is in a slip state. In detail, the difference between the wheel speeds of the left and right driven wheels $W_{RL}$, $W_{RR}$ is greater than or equal to a predetermined value (That is, one of the left and right driven wheels $W_{RL}$, $W_{RR}$ is slipping and the wheel speed thereof is excessively high.)

Herein, the engine control section 53 can determine the skid state and the slip state, based on wheel speeds detected by the respective wheel speed sensors $37_{FL}$, $37_{FR}$, $37_{RL}$, $37_{RR}$. For determination of such a skid state and a slip state, a determination threshold of a traction control system (TCS) for prevention of spin-off of wheels in accelerating or the like is suitably used.

Further, the engine control section 53 transitions from STATE 3 to STATE 1 if any one of the following Conditions 6 is satisfied.

Conditions 6
  The electric storage amount of the battery 21 is smaller than the above-described predetermined electric storage amount (for example, an electric storage amount that is sufficient to supply electrical power to other units of the vehicle 1, while supplying electrical power to the motor 12 in order to make the motor 12 generate an assist torque).
  The steering angle is exceeding the above-described first predetermined steering angle.
  The gear ratio of the transmission 13 is exceeding the above-described predetermined gear ratio (for example, a value on the boundary between the low speed region and the medium speed region). If the transmission 13 is a transmission with gears, the gear stage is, for example, other than second to sixth stages.
  The vehicle speed is lower than the predetermined vehicle speed (for example, the value on the boundary between the low speed region and the medium speed region).
  The switch 44 is again pressed down, and the flag of the switch 44 is 0.

That is, if the electric storage amount of the battery 21 is lower than the predetermined electric storage amount, the engine control section 53 prohibits changing to the plus sport mode even when the operation amount of the accelerator pedal increases after selection of the plus sport mode by operation of the switch 44. Further, if the steering angle exceeds the first predetermined steering angle, the engine control section 53 prohibits changing to the plus sport mode even when the operation amount of the accelerator pedal increases after selection of the plus sport mode by operation of the switch 44.

Herein, the engine control section 53 changes the display content on the display section 61 from that in FIG. 6C to that in FIG. 6A. That is, the engine control section 53 makes the READY mark 61c turned off, and thereby notifies the driver that changing to the plus sport mode is now prohibited.

Still further, if the following Condition 7 is satisfied, the engine control section 53 transitions from STATE 3 to STATE 4.

Condition 7
  The operation amount of the accelerator pedal is increasing by an amount larger than or equal to a first predetermined operation amount (for example, a first predetermined value % to the operable whole operation amount per 100 milliseconds).

STATE 4

Figure 6D:
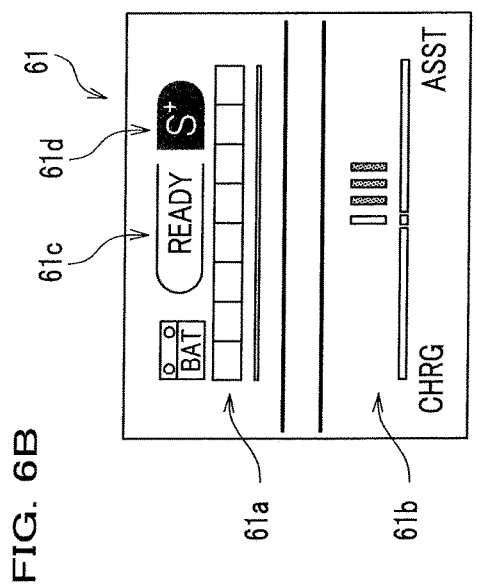

STATE 4 is a state in operation in which the engine 11 is controlled in the plus sport mode, and the engine control section 53 turns off the READY mark displayed on the display section 61, and makes the plus sport mark blinking and displayed on the display section 61 (see FIG. 6D). The engine control section 53 transitions from STATE 4 to STATE 0 if any one of the following Conditions 8 is satisfied.

Condition 8
  The switch 44 is again pressed down, and the flag of the switch 44 is 0.
  The clutch (not shown) provided between the transmission 13 and the front wheel driving shaft is in a non-fastened state.
  The operation amount of the accelerator pedal is decreasing by an amount larger than or equal to a second predetermined operation amount (for example, a second predetermined value % to the operable whole operation amount per 100 milliseconds). Or, the operation amount of the accelerator pedal is smaller than or equal to a third predetermined operation amount. Incidentally, the second predetermined operation amount (in other words, the second predetermined value %) is set larger than the above-described first predetermined operation amount (in other words, the first predetermined value %).
  The brake pedal switch is ON.
  The driving wheels $W_{FL}$, $W_{FR}$ are in a skid state.
  One of the driven wheels $W_{RL}$, $W_{RR}$ is in a slip state.
  The steering angle is exceeding the second predetermined steering angle (the second predetermined steering angle>the first predetermined steering angle).

Herein, the second predetermined steering angle is desirably set to a value that permits lane change, and can be set such that the second predetermined steering angle becomes larger as the vehicle speed is higher.

That is, when the switch 44 is again operated after the throttle opening degree characteristic is changed to the plus sport mode, the engine control section 53 changes the throttle opening degree characteristic to that before the change. Further, after the throttle opening degree characteristic is changed to the plus sport mode, if operation is made such as to decrease the operation amount of the accelerator pedal, the engine control section 53 changes the throttle opening degree characteristic to that before the change. Further, after the throttle opening degree characteristic is changed to the plus sport mode, if operation of the brake pedal is detected, the engine control section 53 changes the throttle opening degree characteristic to that before the change.

First Operation Example

Figure 7:
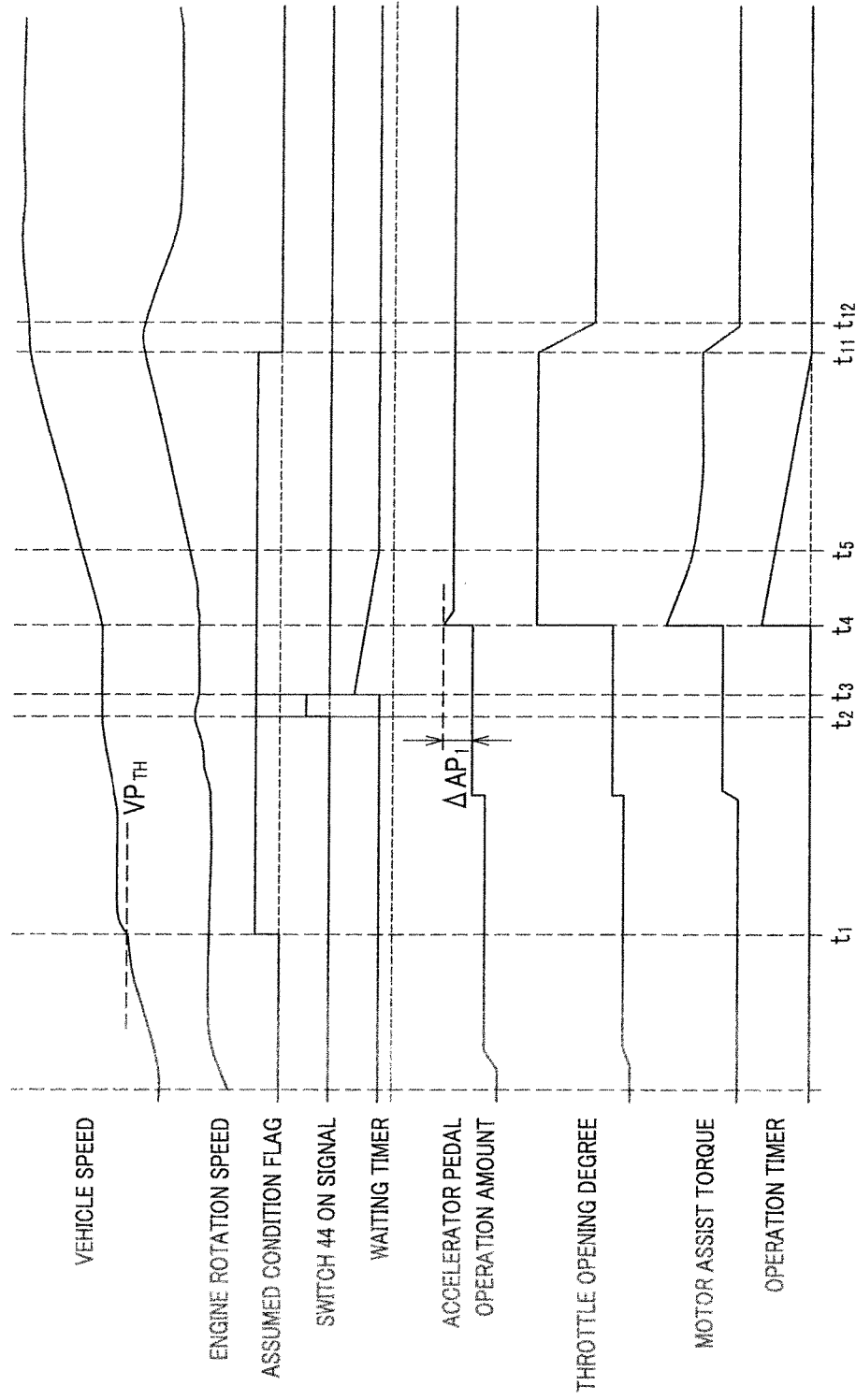
FIG. 7 is a diagram of a timing chart for illustration of a first operation example of the engine control section according to the embodiment of the invention.

Subsequently, a first operation example of the internal combustion engine control system A according to the embodiment of the present invention will be described, referring to FIG. 7. For example, when the vehicle 1 is running in the normal mode and the vehicle speed becomes higher than or equal to a predetermined vehicle speed $VP_{TH}$ at time $t_1$, the assumed conditions for executing the plus sport mode are satisfied, and the engine control section 53 sets the assumed condition flag to '1' and turns into the above-described STATE 2.

Subsequently, if the driver presses down the switch 44 at time $t_2$, then at time $t_3$ when the switch 44 is completely pressed down, the engine control section 53 starts a waiting timer for counting a waiting time. If the driver presses down on the accelerator pedal AP at time $t_4$ earlier than time $t_5$ when the waiting time has elapsed and an increase $\Delta AP_1$ greater than or equal to the first predetermined operation amount is generated on the accelerator pedal AP, then the engine control section 53 changes the throttle opening degree characteristic from the normal mode to the plus sport mode, and thus controls the engine 11 and the motor 12. Thus, the throttle opening degree of the engine 11 increases, and the assist torque by the motor 12 also increases. By the increase in the throttle opening degree of the engine 11, the rotation speed of the engine increases, and thereby and by the increase in the assist torque by the motor 12 together, the vehicle 1 accelerates.

At time $t_4$, the engine control section 53 starts an operation timer for counting an operation time (for example, a value between several seconds and several tens of seconds). When the operation timer completes counting the operation time at time $t_{11}$, the engine control section 53 changes the throttle opening degree characteristic from the plus sport mode to the mode (herein the normal mode) before the change, and thus controls the engine 11 and the motor 12. The period time $t_{11}$-time $t_{12}$ is a period in which the throttle opening degree of the engine 11 and the assist torque by the motor 12 decrease due to the change of the throttle opening degree characteristic.

Second Operation Example

Figure 8:
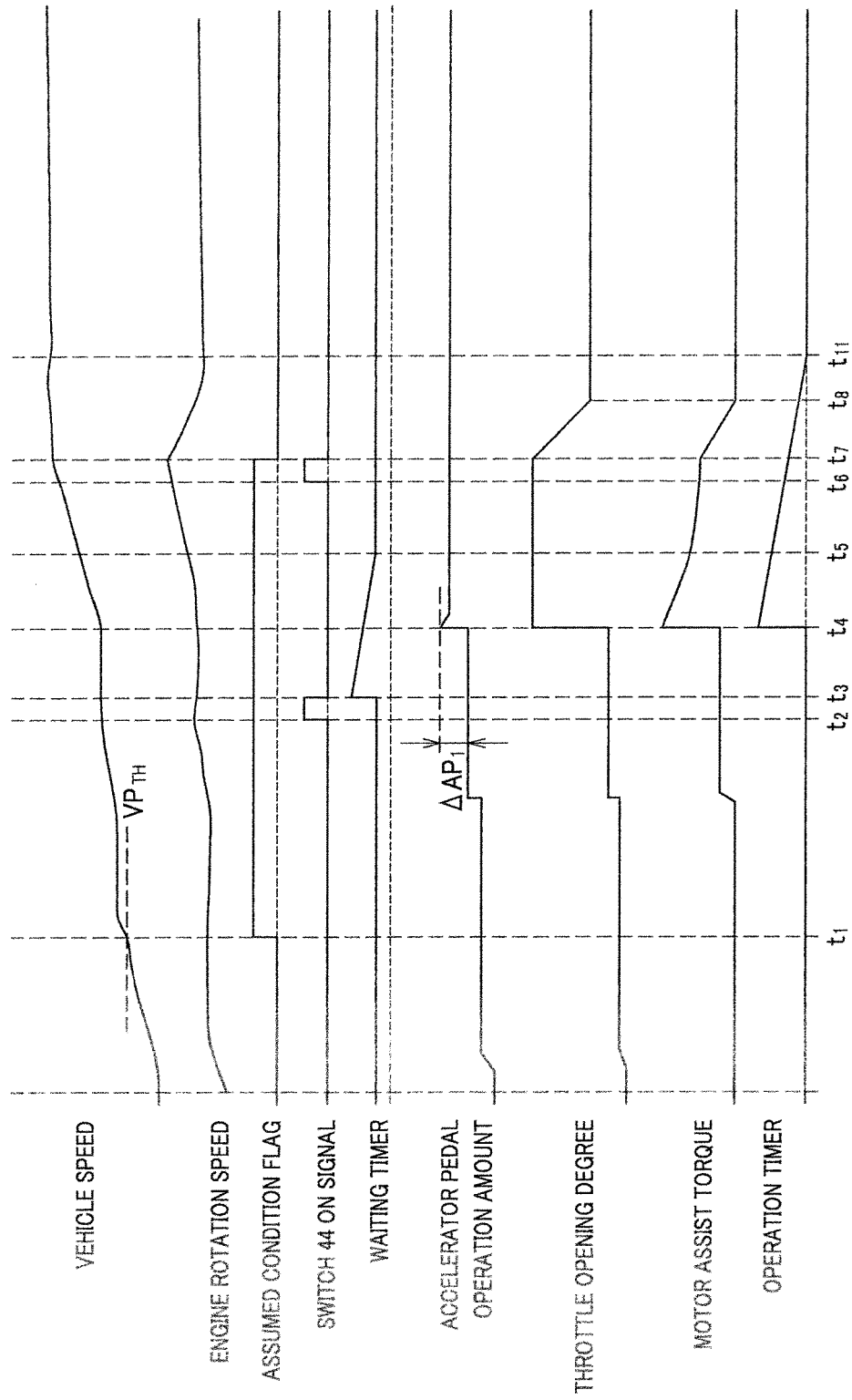
FIG. 8 is a diagram of a timing chart for illustration of a second operation example of the engine control section according to the embodiment of the invention.

Subsequently, a second operation example of the internal combustion engine control system A according to the embodiment of the present invention will be described, focusing on the difference from the first operation example and referring to FIG. 8.

In the second operation example, if the driver presses down the switch 44 at time $t_6$ between time $t_4$ and time $t_{11}$, then at time $t_7$ when the driver completes the pressing down of the switch 44, the engine control section 53 changes the throttle opening degree characteristic from the plus sport mode to the mode (herein the normal mode) before the change and thus controls the engine 11 and the motor 12. The period time $t_7$-time $t_8$ is a period in which the throttle opening degree of the engine 11 and the assist torque by the motor 12 decrease due to the change of the throttle opening degree characteristic.

Third Operation Example

Figure 9:
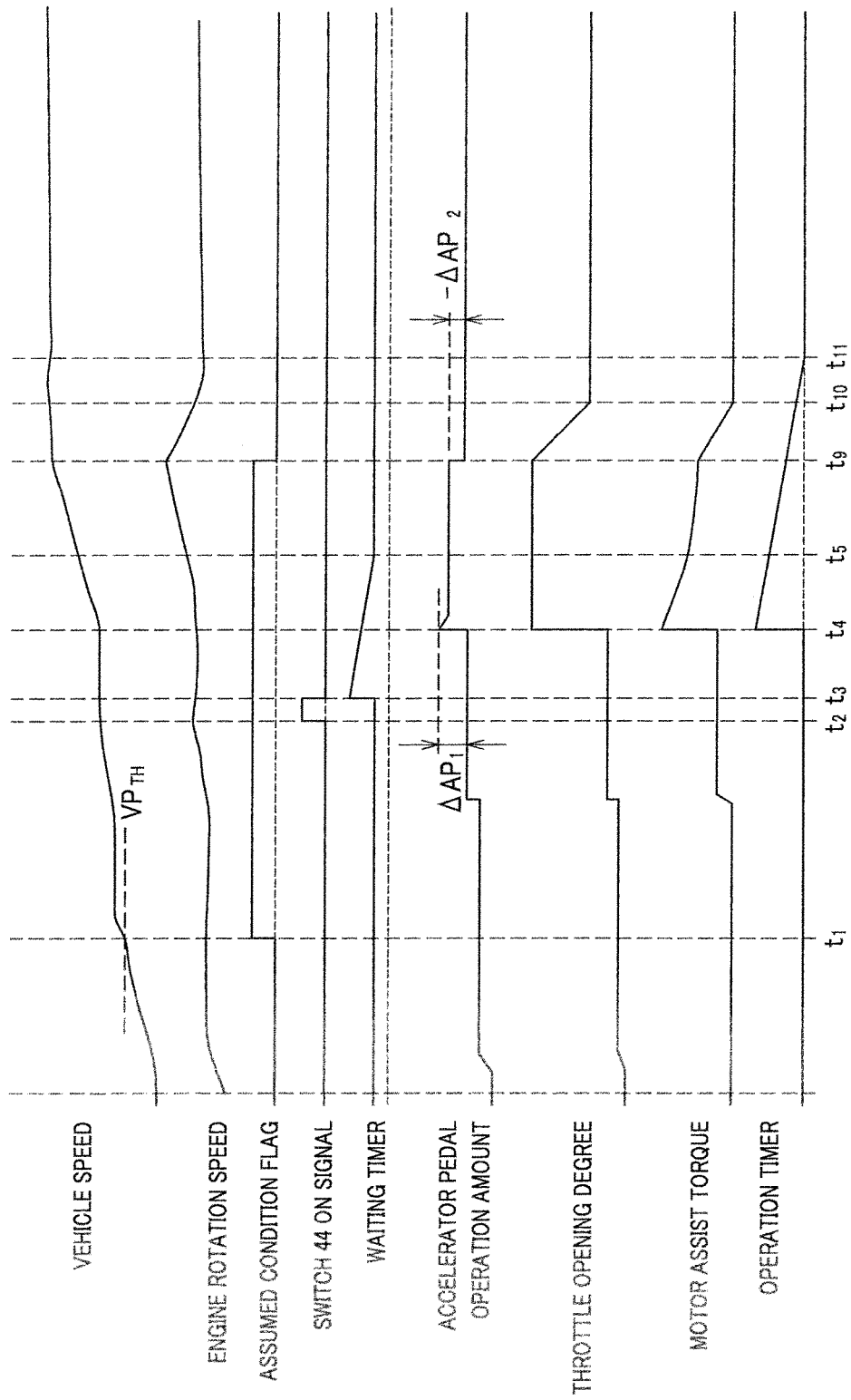
FIG. 9 is a diagram of a timing chart for illustration of a third operation example of the engine control section according to the embodiment of the invention.

Subsequently, a third operation example of the internal combustion engine control system A according to the embodiment of the present invention will be described, focusing on the difference from the first operation example and referring to FIG. 9.

In the third operation example, if the driver generates a decrease in the amount of pressing down on the accelerator pedal AP by $-\Delta AP_2$, which is a decrease with an amount greater than or equal to the second predetermined operation amount, then the engine control section 53 changes the throttle opening degree characteristic from the plus sport mode to the mode (herein the normal mode) before the change and thus controls the engine 11 and the motor 12. The period time $t_9$-time $t_{10}$ is a period in which the throttle opening degree of the engine 11 and the assist torque by the motor 12 decrease due to the change of the throttle opening degree characteristic.

After selection of the plus sport mode by operation of the switch 44, the internal combustion engine control system A according to the embodiment of the present invention changes the throttle opening degree to the plus sport mode on condition of an increase in the operation amount of the accelerator pedal. Accordingly, after the switch 44 is operated, changing to the plus sport mode is not executed until the driver presses down on the accelerator pedal AP, and in case that the driver does not press down on the accelerator pedal AP, changing to the plus sport mode is not executed. Thus, it is possible to prevent acceleration caused by erroneous operation of the switch 44 by the driver, and appropriately associate the driver's intention of accelerating and a change of the throttle opening degree characteristic with each other.

Further, if the switch 44 is again operated after the throttle opening degree characteristic is changed to the plus sport mode, if operation is performed such as to decrease the operation amount of the accelerator pedal after the throttle opening degree characteristic is changed to the plus sport mode, if operation of the brake pedal is detected after the throttle opening degree characteristic is changed to the plus sport mode, or in another case like these, the internal combustion engine control system A according to the embodiment of the present invention changes the throttle opening degree characteristic to that before the change. Accordingly, it is possible to appropriately terminate the plus sport mode and appropriately associate the driver's intention of accelerating and a change of the throttle opening degree characteristic with each other.

Still further, if the electric storage amount of the battery 21 is smaller than a predetermined electric storage amount, if the steering angle exceeds a first predetermined steering angle, or in a case like these, even when the operation amount of the accelerator pedal increases after selection of the plus sport mode by operation of the switch 44, the internal combustion engine control system A according to the embodiment of the present invention prohibits changing to the plus sport mode. Accordingly, it is possible to prevent changing to the plus sport mode, in a state that is unsuitable for the plus sport mode.

Yet further, the internal combustion engine control system A according to the embodiment of the present invention displays, on the display section 61, a waiting state for which the plus sport mode has been selected and a state for which the plus sport mode is in operation. Accordingly, the situation of the vehicle 1 can be appropriately notified to the driver.

When prohibiting changing to the plus sport mode, the internal combustion engine control system A according to the embodiment of the present invention notifies the display section 61 of this fact. Accordingly, it is possible to prevent the driver from having a strange feeling caused by impossibility of transitions to the plus sport mode.

An embodiment according to the present invention has been described above, however, the invention is not limited to the embodiment and changes and modifications can be made, as appropriate, without departing from the spirit of the invention. For example, the operation timer can be omitted. Further, instead of obtaining a vehicle speed from the vehicle speed sensor 33 as the vehicle speed detecting section, arrangement may be made such as to provide a vehicle speed computing section, in the ECU 50, for computing a vehicle speed, based on wheel speeds detected by the wheel speed sensors $37_{FL}$, $37_{FR}$, $37_{RL}$, $37_{RR}$. Still further, as the steering angle detecting section, instead of providing the steering angle sensor, arrangement may be made such as to provide a turning angle sensor for detecting the turning angle of the driving wheels $W_{FL}$, $W_{FR}$. Yet further, arrangement may be made such that, if ON signal of the switch 44 has continued for a time longer than or equal to a first predetermined time (for example, a value between several tens of milliseconds and 100 milliseconds), the engine control section 52 resets the flag to thereby prevent transition from STATE 2 to STATE 3 even when an erroneous operation of the switch 44 has been made during steering operation of the steering wheel H. Further, arrangement may be made such that, if output of ON signal of the switch 44 has continued for a time longer than or equal to a second predetermined time (for example, a value between one second and several seconds), the engine control section 52 determines that fixing of the switch 44 has occurred and prohibits changing to the plus sport mode.

DESCRIPTION OF REFERENCE SYMBOLS

A: internal combustion engine control system
1: vehicle
11: engine (internal combustion engine)
12: motor
21: battery
31: accelerator pedal operation amount sensor (accelerator pedal operation amount detecting section)
32: brake pedal switch (brake pedal operation detecting section)
33: vehicle speed sensor (vehicle speed detecting section)
34: steering angle sensor (steering angle detecting section)
35: voltage sensor (battery electric storage amount detecting section)
36: current sensor (battery electric storage amount detecting section)
40: operating section
44: switch
50: ECU
51: battery electric storage amount computing section (battery electric storage amount detecting section)
52: storage section
53: engine control section (control section)
60: notifying section
61: display section

The invention claimed is:

1. An internal combustion engine control system for controlling an internal combustion engine of a vehicle, comprising:
an accelerator pedal operation amount detecting section for detecting an accelerator pedal operation amount of the vehicle by a driver;
a storage section that stores at least a first increase amount of a throttle opening degree with respect to an increase amount of an accelerator pedal operation amount as a first throttle opening degree characteristic and a second increase amount of a throttle opening degree larger than the first increase amount of a throttle opening degree with respect to the increase amount of an accelerator pedal operation amount as a second throttle opening degree characteristic;
an operating section for selecting the second throttle opening degree characteristic corresponding to an operation by the driver; and
a control section for controlling the throttle opening degree of the internal combustion engine, based on the first throttle opening degree characteristic or the second throttle opening degree characteristic and the detected accelerator pedal operation amount,
wherein the control section changes the first throttle opening degree characteristic to the second throttle opening degree characteristic on condition that an increase in the accelerator pedal operation amount larger than the predetermined operation amount by the driver occurs within a predetermined time after the selection of the second throttle opening degree characteristic by operation of the second operating section.

2. The internal combustion engine control system according to claim 1,
wherein the second throttle opening degree characteristic selected by the operating section is set such that an increase in the second throttle opening degree accompanying an increase in the accelerator pedal operation amount is greater than that of the second throttle opening degree characteristic before the change.

3. The internal combustion engine control system according to claim 1,
wherein, after the change to the first throttle opening degree characteristic or the second throttle opening degree characteristic, if the operating section is again operated, then the control section changes the throttle opening degree characteristic to that before the change.

4. The internal combustion engine control system according to claim 1,
wherein, after the change to the first throttle opening degree characteristic or the second throttle opening degree characteristic, if an operation is performed such that the accelerator pedal operation amount decreases, then the control section changes the throttle opening degree characteristic to that before the change.

5. The internal combustion engine control system according to claim 1, further comprising:
a brake pedal operation detecting section for detecting a brake pedal operation of the vehicle,
wherein, after the change to the first throttle opening degree characteristic or the second throttle opening degree characteristic, if the brake pedal operation is detected, then the control section changes the throttle opening degree characteristic to that before the change.

6. The internal combustion engine control system according to claim 1, further comprising:
a vehicle speed detecting section for detecting a vehicle speed of the vehicle,
wherein, in a state that the vehicle speed is lower than a predetermined vehicle speed, the control section prohibits changing the throttle opening degree characteristic even if the accelerator pedal operation amount increases after selection of the throttle opening degree characteristic by operation of the operating section.

7. The internal combustion engine control system according to claim 1,
wherein the vehicle includes:
a motor that functions as a movement power source of the vehicle as well as the internal combustion engine; and
a battery for supplying electrical power to the motor,
wherein the internal combustion engine control system comprises a battery electric storage amount detecting section for detecting an electric storage amount of the battery,
and wherein, in a state that the electric storage amount of the battery is smaller than a predetermined electric storage amount, the control section prohibits changing the throttle opening degree characteristic even if the accelerator pedal operation amount increases after selection of the throttle opening degree characteristic by operation of the operating section.

8. The internal combustion engine control system according to claim 1, comprising:
a steering angle detecting section for detecting a steering angle of the vehicle,
wherein, in a state that the steering angle exceeds a predetermined steering angle, the control section prohibits changing the throttle opening degree characteristic even if the accelerator pedal operation amount increases after selection of the throttle opening degree characteristic by operation of the operating section.

9. The internal combustion engine control system according to claim 1, further comprising:
a notifying section for notifying a waiting state in which the throttle opening degree characteristic has been selected and an operating state in which throttle opening degree characteristic has been changed to the first throttle opening degree characteristic or the second throttle opening degree characteristic, based on output from the control section.

10. The internal combustion engine control system according to claim 7, further comprising:
a notifying section for notifying a waiting state in which the throttle opening degree characteristic has been selected and an operating state in which throttle opening degree characteristic has been changed to the first throttle opening degree characteristic or the second throttle opening degree characteristic,
wherein, when the control section prohibits changing the throttle opening degree characteristic, the control section outputs notification of the prohibition to the notifying section.

11. The internal combustion engine control system according to claim 8, further comprising:
a notifying section for notifying a waiting state in which the throttle opening degree characteristic has been selected and an operating state in which the throttle opening degree characteristic has been changed to the first throttle opening degree characteristic or the second throttle opening degree characteristic,
wherein, when the control section prohibits changing the throttle opening degree characteristic, the control section outputs notification of the prohibition to the notifying section.

\* \* \* \* \*